United States Patent

[11] 3,582,567

[72] Inventors Percy T. Cox;
Albert P. Richter, Jr., both of Houston, Tex.

[21] Appl. No. 736,744
[22] Filed June 13, 1968
[45] Patented June 1, 1971
[73] Assignee Texaco Inc.
New York, N.Y.

[54] ELIMINATION OF HYSTERESIS EFFECTS IN CARRIER ERASE MAGNETIC RECORDING SYSTEMS
5 Claims, 2 Drawing Figs.

[52] U.S. Cl. .......... 179/100.2
[51] Int. Cl. .......... G11b 5/02, G11b 5/44, G11b 5/46
[50] Field of Search .......... 179/100.2, 100.2 K, 100.2 D; 340/174.1 B

[56] References Cited

UNITED STATES PATENTS 3,013,124 12/1961 Epstein .......... 179/100.2
3,275,757 9/1966 Sasseen .......... 179/100.2

*Primary Examiner*—Bernard Konick
*Assistant Examiner*—Robert S. Tupper
*Attorneys*—K. E. Kavanagh, Thomas H. Whaley and Robert J. Sanders, Jr.

ABSTRACT: Hysteresis effects in a carrier erase magnetic recording system are eliminated by momentarily short circuiting the magnetic recording head to induce a damped sinusoidal ringing current in the recording head or, in the alternative, by passing a short burst of direct current thru the recording head in the direction opposite to the normal DC erase current.

ELIMINATION OF HYSTERESIS EFFECTS IN CARRIER ERASE MAGNETIC RECORDING SYSTEMS

BACKGROUND OF THE INVENTION

This invention pertains, in general, to magnetic recording systems; and, more particularly, to the elimination of hysteresis effects in carrier erase magnetic recording systems.

A conventional technique of recording information on magnetic tape involves passing alternating current (AC) through a magnetic recording head. The magnetic field produced in the recording head is constantly changing direction and, thus, no hysteresis or retention of magnetism occurs. Another recording technique which is common in the instrumentation recording field is the so-called carrier erase recording technique. This technique if often used in place of the aforementioned conventional AC recording technique because the recording is independent of the speed of the magnetic tape. In instrumentation recording systems it is often necessary to operate with a low tape speed and if the recorder is located in an environment of high shock and vibration it is very difficult to maintain the required constant tape speed, especially at the relatively low tape speeds employed. For example, tape speeds of about one inch per minute are employed in connection with recording data in connection with logging while drilling operations of the kind generally disclosed in U.S. Pat. application Ser. No. 685,568, now U.S. Pat. No. 3,486,107, filed Nov. 24, 1967 and entitled "Logging While Drilling System." In connection with such instrumentation systems the carrier erase recording system is preferred because of its independence of tape speed over the aforementioned conventional AC recording technique.

Briefly, in the carrier erase technique a constant amplitude carrier is prerecorded on magnetic tape and loaded into the carrier erase recording system. Direct current (DC) signals proportional to the parameters being measured flow through the recording head as the magnetic tape with prerecorded carrier passes over the recording head. The carrier will then be erased in proportion to the amplitude of the DC erase current, independent of tape speed. However, there is one drawback in connection with the carrier erase recording technique. When the unidirectional or DC erase current delivered to the magnetic recording head is reduced to zero the attendant magnetic field does not completely disappear due to hysteresis present in the recording head. This results in a partial erasure of the carrier thereby providing an apparent signal on the magnetic tape when, in fact, there should be none.

SUMMARY OF THE INVENTION

The general object of the present invention is to eliminate the aforementioned hysteresis effect in carrier erase magnetic recording systems.

Another object of the present invention is to provide relatively simple and inexpensive but, nevertheless, reliable means for eliminating the aforementioned hysteresis effect in carrier erase magnetic recording systems.

Briefly, in accordance with one embodiment of the invention a magnetic recording head is momentarily short-circuited in order to induce a damped sinusoidal current flow in the recording head in order to nullify the hysteresis therein thereby allowing the recording system to record the true signal level.

In accordance with an alternative embodiment of the invention a short duration direct current pulse is passed through the recording head in a direction opposite to that of the normal direct current erase current in order to nullify the hysteresis effect.

Other objects of the invention, as well as the many features and advantages thereof will appear upon examination of the accompanying drawing FIGS. together with the detailed description, hereinafter set forth, of illustrative embodiments of the invention.

DESCRIPTION OF THE DRAWING FIGURES

DESCRIPTION OF INVENTION

Figure 1:
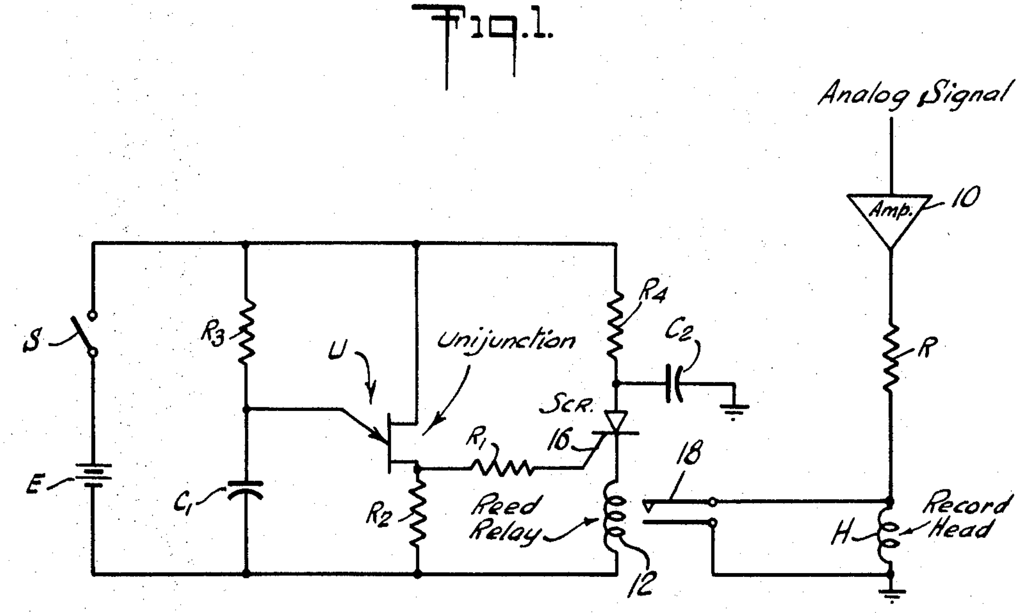
FIG. 1 is a schematic diagram showing one circuit arrangement in accordance with the invention.

As shown in FIG. 1 an analog signal is amplified in an amplifier 10 and the amplified signal passes through a resistor R to the coil H of the recording head. A reed switch relay comprising a set of normally open contacts 18 and an operating coil 12 is provided, as shown. The switch contacts 18 are connected in parallel across the coil H of the recording head. The coil 12 of the reed switch relay is energized whenever a silicon controlled rectifier (SCR) 14 is turned on, allowing capacitor $C_2$ to discharge. As indicated in FIG. 1 the controlled rectifier 14 is connected in series with the relay coil 12. Rectifier 14 is fired whenever its gates electrode 16 is energized through the path including the resistor R1.

As shown in FIG. 1 an unijunction transistor pulse circuit is employed to energize the gate 16 of rectifier 14 through the path including the resistor R1. The aforementioned pulse circuit is comprised of a unijunction transistor U, a resistor R2, another resistor R3 and a capacitor $C_1$. A direct current source E and a series switch S included as shown.

Briefly, whenever the series switch S is closed the voltage source E charges the capacitor $C_1$ through its series resistor R3 and whenever the voltage on capacitor $C_1$ attains a predetermined level the emitter electrode of the unijunction transistor U breaks down and current flow and current flow through the resistor R2 occurs. The voltage drop across the resistor R2 causes sufficient current to flow to the gate 16 through the resistor R1 thereby turning the rectifier 14 on. When rectifier 14 turns on, or is fired, the relay coil 12 is energized and closes the normally open switch contacts 18 thereby short circuiting the recording head H. The recording head H which is momentarily short circuited by the closure of contacts 18 has a damped sinusoidal current flow induced therein. This damped sinusoidal, or ringing, current in the recording coil H reduces the residual magnetism in the recording head to zero thereby nullifying the hysteresis effects therein.

When capacitor $C_2$ has discharged below the level required to hold the SCR 14 in conduction, the coil 12 will deenergize thereby opening contacts 18. The contacts 18 are closed as often as the coil 12 is energized and remain closed for as long as the coil 12 remains energized. The rate of energization of the coil 12 is dependent upon the time constant determined by the resistor R3 and the capacitor $C_1$. Thus, the frequency of the energization of coil 12 and closure of contacts 18 can be (according to the resistance and capacitance values of resistor R3 and capacitor $C_1$) made compatible with the frequency of the analog signal through the coil H of the recording head. This process is repeated at regular intervals depending on tape speed, to insure that as the recording level changes, hysteresis is continuously being nullified and a true signal level is being recorded on the magnetic tape.

Figure 2:
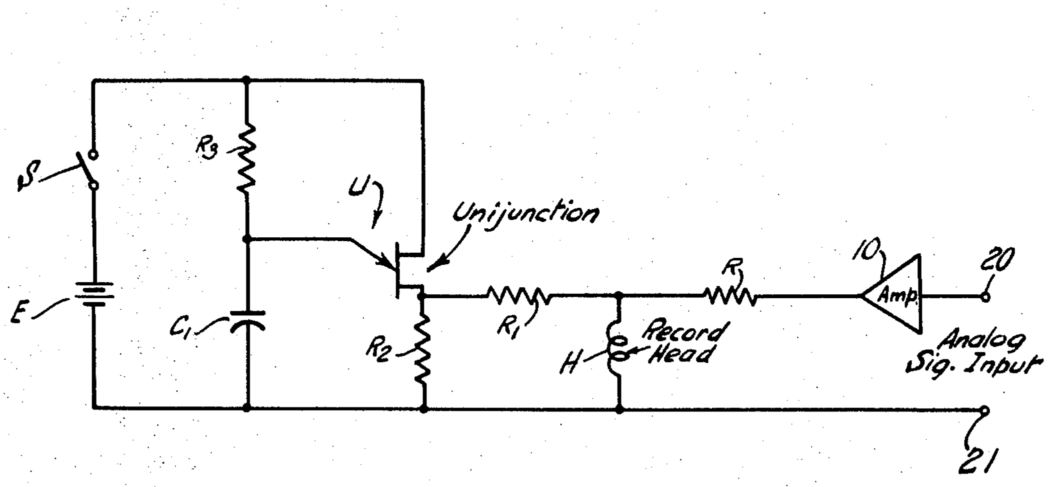
FIG. 2 is another schematic diagram showing another circuit arrangement according to the invention.

In FIG. 2 an alternative embodiment of the invention is illustrated in schematic form. In FIG. 2 elements which are common to the elements employed in FIG. 1 are designated with like reference characters and numbers. In FIG. 2 let it be assumed that the series switch S is closed and the DC voltage source E charges the capacitor $C_1$ through the resistor R3 to a predetermined level at which level the unijunction transistor U causes current to flow through the load resistor R2. The voltage developed across the resistor R2 causes a DC current to flow through the resistor R1 and through the recording head coil H. The frequency, or repetition rate of the flow of DC current through the coil H is determined by the time constant of the resistor R3 and capacitor $C_1$. The DC current passing through the resistor R1 through the coil H is in a direction opposite to the normal DC erase current. The normal DC erase current is introduced at the terminals 20 and 21.

The introduction of the DC pulse through R1 and through the coil H will, in effect, shock the self resonant coil H thereby producing a damped sinusoidal, or ringing, current in the coil H similar to that hereinbefore mentioned with reference to the operation of FIG. 1. Repetition of this pulse at suitable intervals (in accordance with the choice of resistor R3 and capacitor $C_1$) will continuously demagnetize the head thereby eliminating the false signal levels caused by the hysteresis effect in the head.

While specific embodiments of the invention have been shown and described in detail to illustrate the application of the principles of the invention it is to be understood that the invention may be otherwise embodied without departing from such principles.

We Claim:

1. A method of recording information on a magnetic storage medium with a recording head having a coil comprising the steps of: introducing a carrier current to said coil of said recording head to record a carrier signal on said magnetic storage medium; introducing an erase current to said coil of said recording head to erase at least a part of said carrier signal on the magnetic storage medium, said erase current being representative of a parameter containing the information; periodically eliminating the erase current to said coil of said recording head; and, periodically introducing additional current to said coil of said recording head while said erase current is eliminated to eliminate hysteresis in said recording head whereby erroneous erasure of the carrier signal from said recording medium is prevented.

2. The method according to claim l, wherein the erase current introduced to the coil of the recording head is direct current and wherein the carrier current introduced to the coil of the recording head is a constant amplitude undulating current and wherein the additional current introduced to the coil of the recording head is a damped sinusoidal current.

3. The method according to claim 2, wherein the additional current is induced as a damped sinusoidal current in the coil of the recording head by momentarily short circuiting said coil.

4. The method according to claim 2, wherein the additional current is introduced into the coil of the recording head in a direction opposite to that of the erase current whereby a damped sinusoidal current flows in said coil.

5. A carrier erase recording system comprising: a magnetic recording medium having a constant amplitude carrier signal prerecorded thereon; a magnetic recording head having a coil thereabout, said coil being adapted for carrying an erase current, representative of a parameter, to erase the prerecorded carrier signal on the recording medium; timing circuit means for periodically reducing the erase current to zero magnitude; and, means periodically operable to short circuit said coil while said erase current is at zero magnitude in order to introduce an additional sinusoidal current in said coil to prevent retention of residual magnetism in said recording head whereby erroneous erasure of the carrier signal from said recording medium is prevented.